(12) United States Patent
Huang

(10) Patent No.: US 10,393,194 B1
(45) Date of Patent: Aug. 27, 2019

(54) RATCHET DRIVING STRUCTURE OF HUB

(71) Applicant: Ren-He Huang, Taoyuan (TW)

(72) Inventor: Ren-He Huang, Taoyuan (TW)

(73) Assignee: BIKETECH CO., LTD., New Taipei (TW)

( * ) Notice: Subject to any disclaimer, the term of this patent is extended or adjusted under 35 U.S.C. 154(b) by 33 days.

(21) Appl. No.: 15/939,519

(22) Filed: Mar. 29, 2018

(30) Foreign Application Priority Data

Mar. 2, 2018 (TW) .............................. 107202800 U

(51) Int. Cl.
*F16D 41/30* (2006.01)
*F16D 41/24* (2006.01)
*F16D 41/12* (2006.01)

(52) U.S. Cl.
CPC ............. *F16D 41/30* (2013.01); *F16D 41/12* (2013.01); *F16D 41/24* (2013.01)

(58) Field of Classification Search
None
See application file for complete search history.

(56) References Cited

U.S. PATENT DOCUMENTS

| 4,593,799 A * | 6/1986 | Ozaki | F16D 41/36 192/46 |
| 6,105,742 A * | 8/2000 | Seith | F16D 41/22 192/46 |
| 8,276,731 B2 * | 10/2012 | Chen | B60B 27/023 192/46 |
| 8,789,673 B2 * | 7/2014 | Tho | B60B 27/047 192/64 |

* cited by examiner

*Primary Examiner* — Colby M Hansen
(74) *Attorney, Agent, or Firm* — Andrew C. Cheng

(57) ABSTRACT

A hub ratchet wheel driving structure includes a central axle having portions respectively received in and coupled to a hub and a ratchet wheel with bearings interfacing therebetween. The hub has an end formed with a diameter-enlarged stepped hole that receives a stop plate to fit therein and is then coupled to a unidirectional grooved ring that is fixed therein through threading engagement. An end of the ratchet wheel is formed with a reduced-diameter stepped shaft that is fit into the diameter-enlarged stepped hole and has a circumferential wall in which horizontal retention troughs are formed for receiving rear ends of the reversal-preventing pawls to disposed therein in a horizontal direction. The ratchet wheel and the reversal-preventing pawls have portions opposite to each other and formed with first and second retention cavities to receive and retain two opposite ends of springs to constrain the reversal-preventing pawls in position.

4 Claims, 7 Drawing Sheets

RATCHET DRIVING STRUCTURE OF HUB

BACKGROUND OF THE INVENTION

1. Field of the Invention

The present invention relates to the field of bicycle hubs, and more particularly to a hub ratchet driving structure having a ratchet wheel and reversal-preventing pawls respectively formed with first and second retention cavities to retain springs and reversal-preventing pawls and the reversal-preventing pawls being formed with a pawl operation angle notch, the ratchet wheel having an inclined retention groove to set a retention stop plate in a curved configuration for preventing movement of pawls with a reduced contact area therebetween.

2. The Related Arts

Taiwan Utility Model 101200118 discloses a position-constraining and dust-protection structure for reversal-preventing key of a hub ratchet wheel, which makes use of a spring force of a spring plate to drive the reversal-preventing key into engagement with teeth of the hub ratchet in order to achieve the purpose of reversal prevention. This design is different from the present invention of which details will be described below in that the present invention comprises a ratchet wheel and multiple reversal-preventing pawls that are respectively formed with first and second retention cavities to retain springs and thus reversal-preventing pawls. In addition, the present invention provides a pawl operation angle notch that varies an operation angle and the present invention provides an oblique enclosure groove to receive a retention stop plate to fit therein and showing a curved configuration in order to prevent pawls from shifting with a reduced contact area therebetween. On the other hand, in the Taiwan Utility Model mentioned above, a seal has a large contact area and thus different from the present invention.

Further, referring to FIG. 1, a cross-sectional view is provided to show a dense-tooth ratchet wheel of a hub provided in Taiwan Patent No. 04137356, wherein pawls 12 arranged in an interior of a hub 11 is in engagement with a ratchet wheel 13. The pawls 12 uses the spring forces of spring plates 14 to achieve the purposes of preventing reversal of a connection ring 15 of the hub 11. The spring plates 14 of the prior art device are different from the present invention in that the present invention comprises a ratchet wheel and multiple reversal-preventing pawls that are respectively formed with first and second retention cavities to retain springs and thus reversal-preventing pawls. In addition, the present invention provides a pawl operation angle notch that varies an operation angle and the present invention provides an oblique enclosure groove to receive a retention stop plate to fit therein and showing a curved configuration in order to prevent pawls from shifting with a reduced contact area therebetween. All these features of the present invention are missing in the prior art device.

Further, a known fixing structure of spring pawls of a bicycle hub uses a single point fixing solution and as such, the pawls are ready to move during an operation thereof and may easily fall during assembly thereof. The present invention provides reversal-preventing pawls that are each disposed, in a horizontal direction, into a horizontal retention trough of a ratchet wheel in order to prevent falling thereof and also to prevent bouncing away of springs. The reversal-preventing pawls are each provided with an operation angle notch that works collaboratively with a set angle of retention grooves of the ratchet wheel to change an operation angle for an operation thereof. The springs are arranged to hold the position of the reversal-preventing pawls in an operation. The springs, in light of the spring coefficient thereof, help control and improve frictional resistance between the reversal-preventing pawls and the unidirectional grooved ring during the rotation of the bicycle hub and makes it easy to control synchronization among the reversal-preventing pawls.

In consideration of the drawbacks of the prior art discussed above, it is a challenge of those involved in this field to provide a novel structure that helps overcome or alleviates the above problems.

In view of this, the present invention aims to provide a technical solution that overcomes the drawbacks of the prior art.

SUMMARY OF THE INVENTION

The primary objective of the present invention is to provide a ratchet wheel driving structure of a hub, wherein a ratchet wheel and multiple reversal-preventing pawls are respectively formed with first and second retention cavities to receive and retain springs therein and to thus constrain the reversal-preventing pawls in position, and a pawl operation angle notch is provided on the pawl to change an operation angle, and an oblique enclosure groove is provided for receiving and retaining a retention stop plate therein to show a curved configuration in order to prevent pawls from shifting with a reduced contact area therebetween.

To achieve the above objective, the prevent invention provides a ratchet wheel driving structure of a hub, which comprises: a central axle that is partly received in and coupled to a hub with bearing interfacing therebetween and is also partly received in and coupled to a ratchet wheel with bearings interfacing therebetween. The hub has an end formed with a diameter-enlarged stepped hole. The diameter-enlarged stepped hole receives a stop plate to fit therein and is then coupled to a unidirectional grooved ring that is fixed therein through threading engagement. An end of the ratchet wheel is formed with a reduced-diameter stepped shaft that is fit into the diameter-enlarged stepped hole. The reduced-diameter stepped shaft of the ratchet wheel has a circumferential wall in which a plurality of horizontal retention troughs are formed for receiving rear ends of reversal-preventing pawls to disposed therein in a horizontal direction. The ratchet wheel and front ends of the reversal-preventing pawls have portions opposite to each other and formed with first and second retention cavities respectively to receive and retain two opposite ends of springs to constrain the reversal-preventing pawls in position. The reversal-preventing pawls are each formed with a pawl operation angle notch for varying an operation angle thereof. The ratchet wheel is formed with an oblique enclosure groove that receives a retention stop plate to fit therein and show a curved configuration for preventing the pawls from shifting with a reduced contact area therebetween.

BRIEF DESCRIPTION OF THE DRAWINGS

The present invention can be fully understood from the following detailed description and preferred embodiments with reference to the accompanying drawings, in which.

DETAILED DESCRIPTION OF THE PREFERRED EMBODIMENTS

Figure 1:
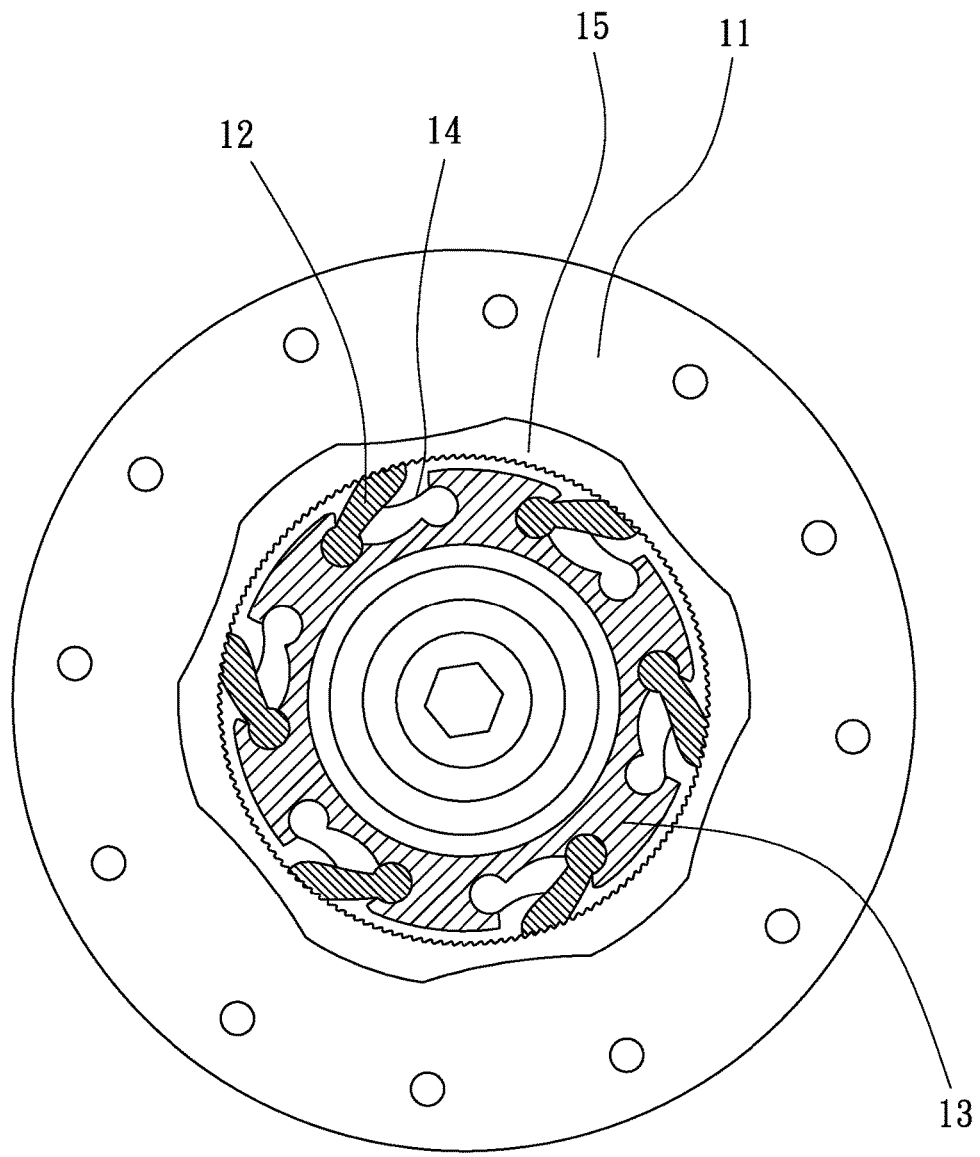
FIG. 1 is a cross-sectional view showing a conventional dense-tooth ratchet wheel of a hub in an assembled form.
Figure 2:
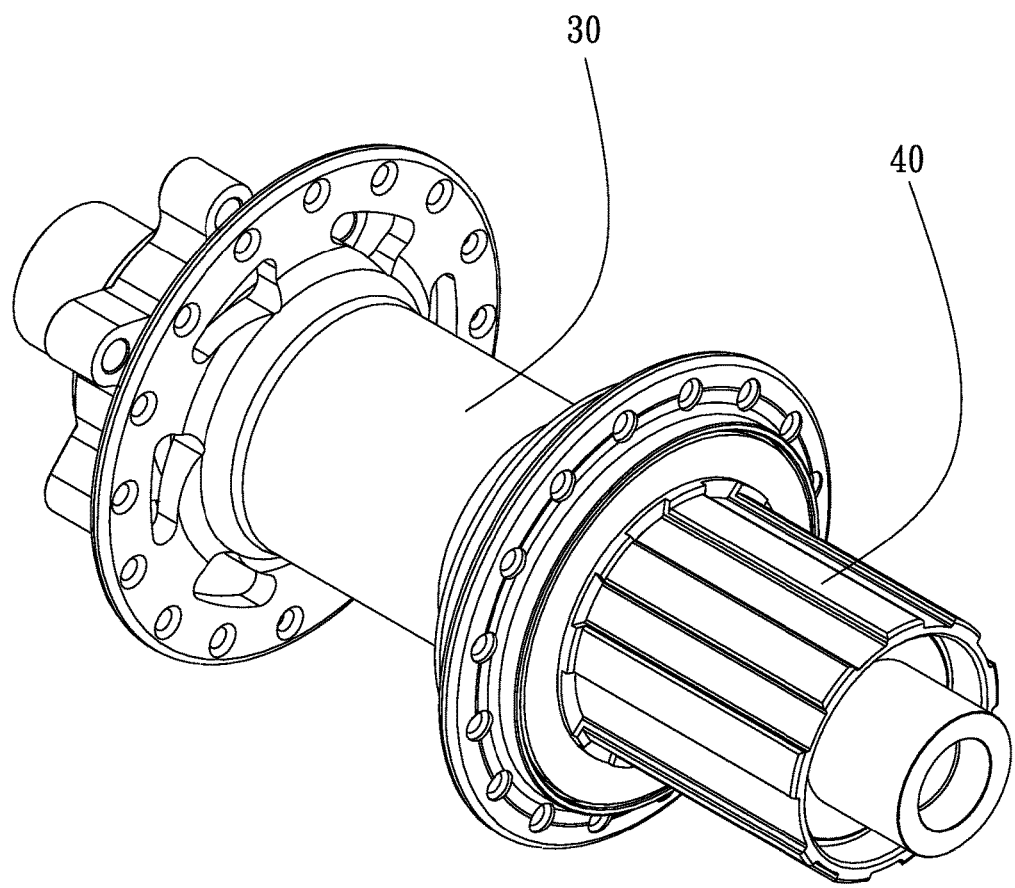
FIG. 2 is a schematic view showing an embodiment of the present invention.

The present invention provides a ratchet wheel driving structure of a bicycle hub.

To better expound the purposes, features, and advantages of the present invention, a detailed description will be given below with reference to an embodiment thereof and the drawings.

Referring to FIGS. 2-5, the present invention provides a ratchet wheel driving structure of a hub, which will be referred to as hub ratchet wheel driving structure, comprising the following components/parts:

A central axle 20 has a first end portion that is received through and coupled to a hub 30 with a plurality of first bearings 21 interfacing therebetween. The central axle 20 has an opposite, second end portion that is received through and coupled to a ratchet wheel 40 with a plurality of second bearings 22 interfacing therebetween. The hub is formed, in one end thereof, with a diameter-enlarged stepped hole 31. The diameter-enlarged stepped hole 31 is assembled with a stop plate 32 arranged therein and then receives a unidirectional grooved ring 33 fixed therein through threading engagement. The ratchet wheel 40 has an end corresponding to the hub 30 and forming a reduced-diameter stepped shaft 41 that is fit into the diameter-enlarged stepped hole 31.

The reduced-diameter stepped shaft 41 of the ratchet wheel 40 has a circumferential wall that is formed with a plurality of horizontal retention troughs 42 that respectively receive, horizontally, a plurality of reversal-preventing pawls 50 to set therein by disposing rear ends 51 of the reversal-preventing pawls 50 in the horizontal retention troughs 42. A plurality of springs 60 are also provided to respectively correspond to the reversal-preventing pawls 50. The ratchet wheel 40 and the front ends 52 of the reversal-preventing pawls 50 are formed, in portions thereof that face each other, with first and second retention cavities 43, 53 that respectively receive and retain two ends of the springs 60 such that the springs 60 impose constraint to the positions of the reversal-preventing pawls 50 to prevent undesired positional shifting of the reversal-preventing pawls 50. The reversal-preventing pawls 50 are each provided in a surface thereof with a pawl operation angle notch 54 having a predetermined depth for setting and varying an operation angle of the reversal-preventing pawls 50. A retention stop plate 70 is further provided. The ratchet wheel 40 is formed therein with an oblique enclosure groove 44 in which the retention stop plate 70 is received and mounted such that the retention stop plate 70 is set in an oblique or curved form as being fit in and partly enclosed or housed by the oblique enclosure groove to form an oblique or curved configuration for constraining the reversal-preventing pawls 50 to prevent undesired positional shifting of the reversal-preventing pawls 50 with contact therebetween being of a reduced contact area.

Figure 6:
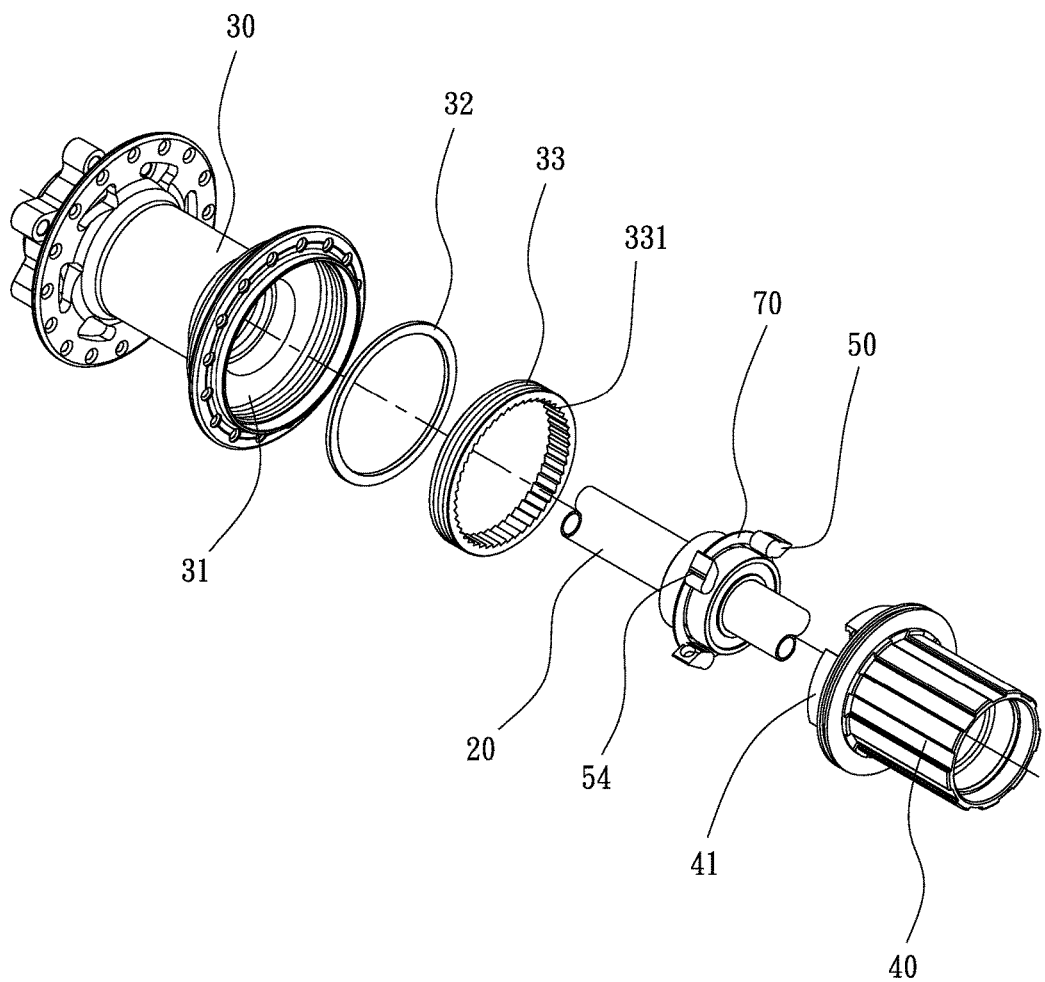
FIG. 6 is also a perspective view, in an exploded form, illustrating the embodiment of the present invention taken from the right side.

Referring to FIG. 6, in the hub ratchet wheel driving structure of the present invention, the retention stop plate 70 can be made of a plastic steel plate to be a plastic-steel-made retention stop plate.

Figure 3:
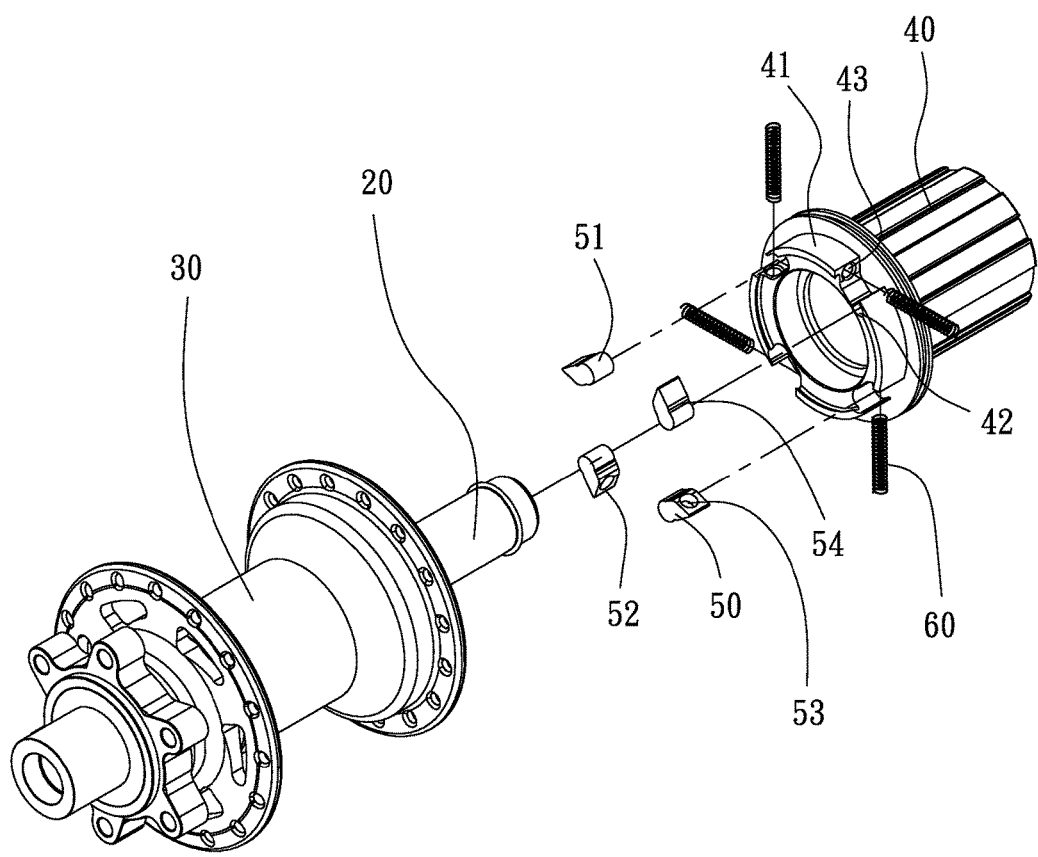
FIG. 3 is a schematic view, in an exploded form, showing the embodiment of the present invention taken from a left side.
Figure 5:
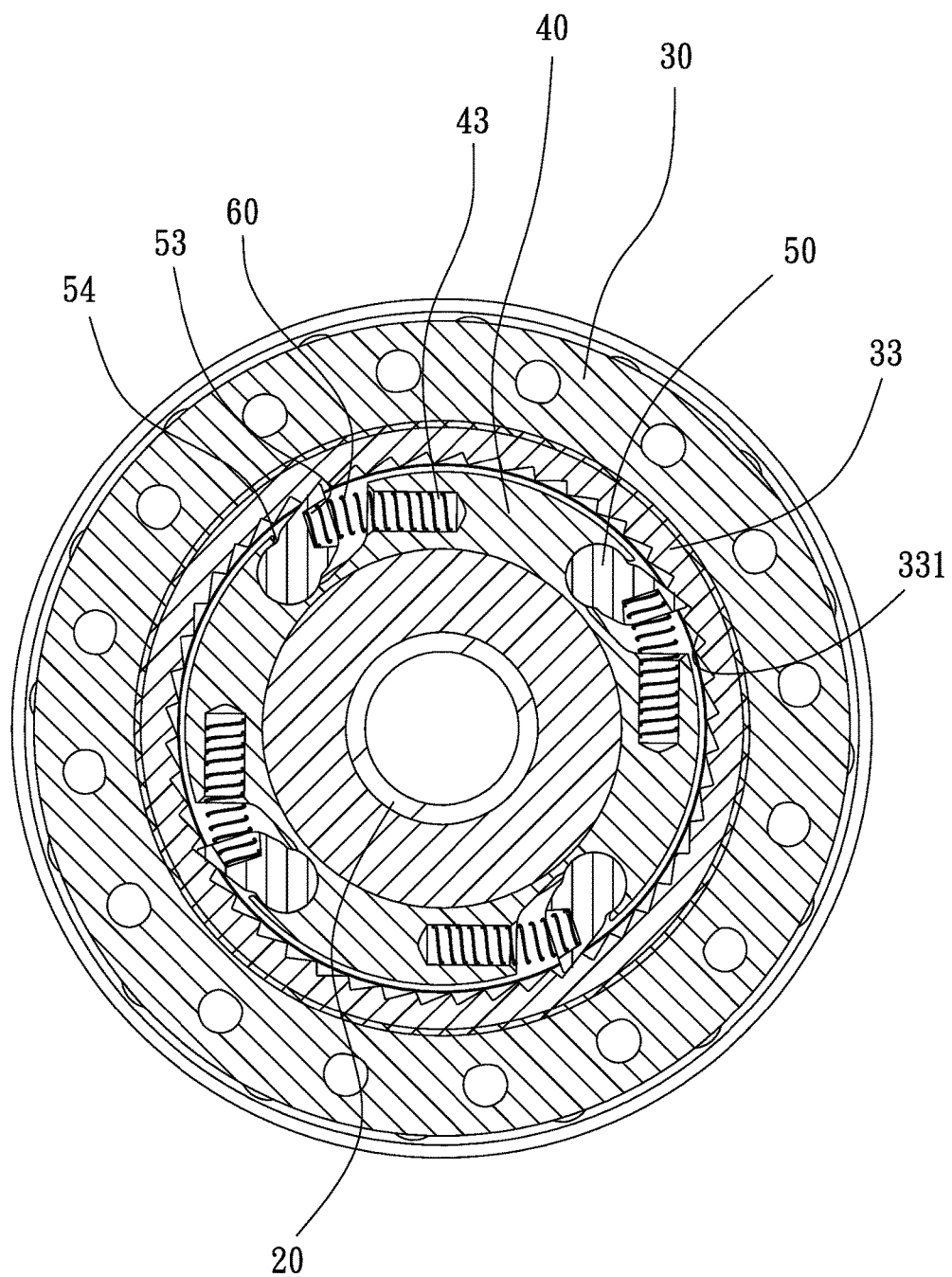
FIG. 5 is a cross-sectional view, in a radial direction, illustrating the embodiment of the present invention.

Referring to FIGS. 3 and 5, in the hub ratchet wheel driving structure of the present invention, the second retention cavities 53 may be of a truncated conic configuration that diverges in a direction from inside to outside.

Figure 4:
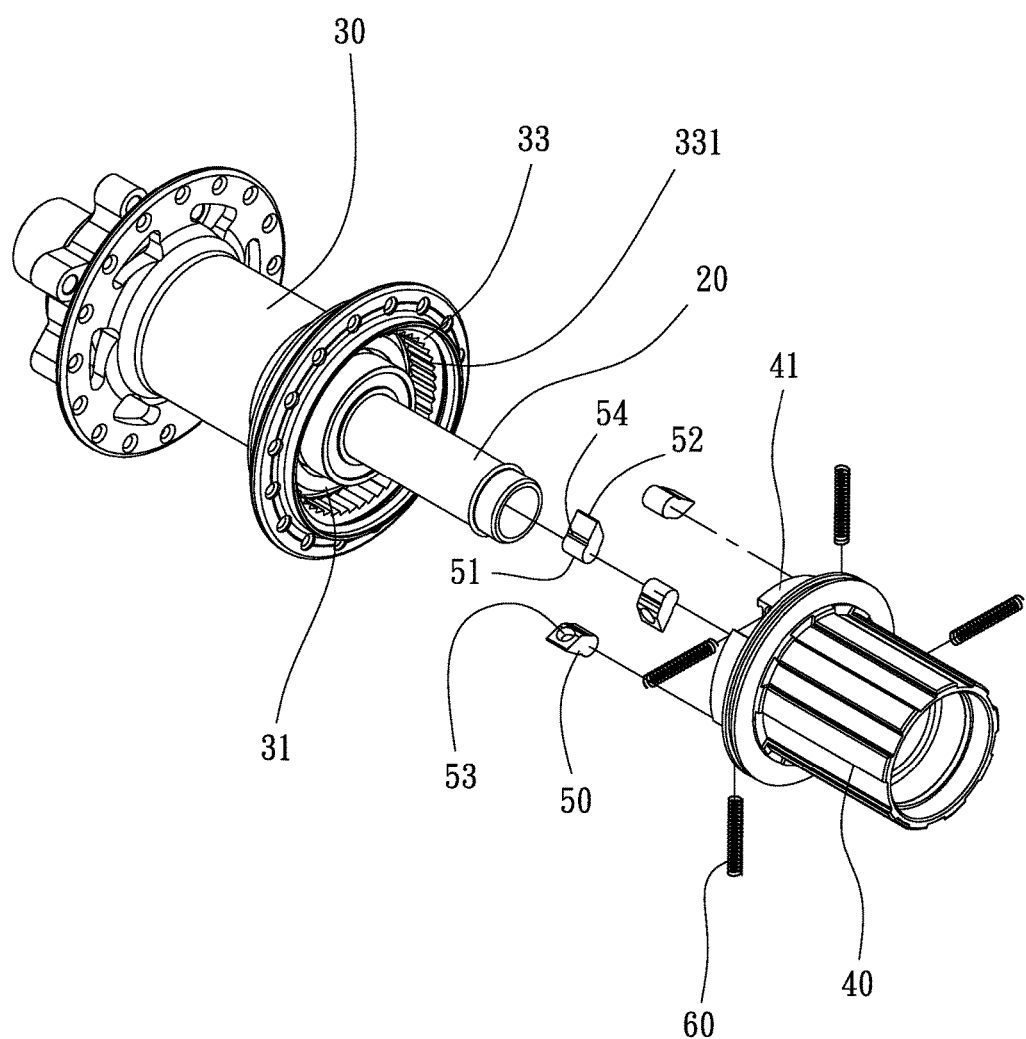
FIG. 4 is a schematic view, in an exploded form, illustrating the embodiment of the present invention taken from a right side.

Referring to FIGS. 3, 4, and 5, the reversal-preventing pawls 50 are each placed, in a horizontal directly, into one of the horizontal retention troughs 42 of the ratchet wheel 40 and this helps prevent falling thereof and bouncing away of the springs 60 in an assembly operation. The pawl operation angle notch 54 works collaboratively with a set angle of the unidirectional grooves 331 of the unidirectional grooved ring 22 to set or vary the operation angle of the device. The springs 60 are arranged to hold the position of the reversal-preventing pawls 50 in an operation. The springs 60, in light of the spring coefficient thereof, helps control and improves frictional resistance between the reversal-preventing pawls 50 and the unidirectional grooved ring 33 during the rotation of the bicycle hub and makes it easy to control synchronization among the reversal-preventing pawls 50.

Referring to FIGS. 4 and 5, in the hub ratchet wheel driving structure of the present invention, the unidirectional grooved ring 33 comprises a plurality of unidirectional grooves 331 formed therein and the pawl operation angle notch 54 can be used in combination with the set angle of the unidirectional grooves 331 of the unidirectional grooved ring 33 for varying the operation angle during an operation.

Figure 7:
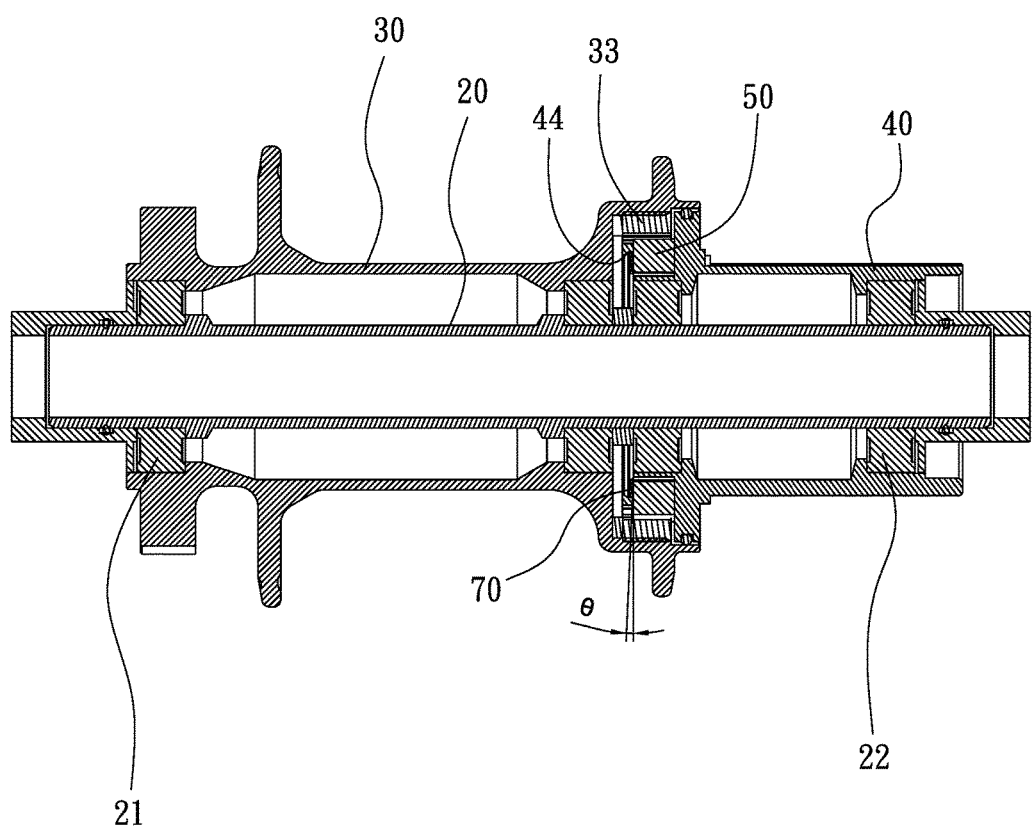
FIG. 7 is a cross-sectional view, in an axial direction, illustrating the embodiment of the present invention.

Referring to FIGS. 6 and 7, the retention stop plate 70 is a retention or holding device that helps reduce undesired positional shifting of the reversal-preventing pawls 50 during an operation. The ratchet wheel 40 is provided with an oblique enclosure groove 44, and the retention stop plate 70 is fit into and retained in the oblique enclosure groove 44 to show an oblique or curved configuration that helps reduce that contact area thereof as in direction contact engagement with the reversal-preventing pawls 50. The retention stop plate 70 and the reversal-preventing pawls 50 form a small gap or an angular interval θ, which could helps reduce resistance caused by direct contact and friction. Since the spacing or angular interval θ is minute, it is possible to effectively control undesired shifting of the reversal-preventing pawls 50.

It is known from the above that the hub ratchet wheel driving structure of the present invention is a novel arrangement in this field in that a ratchet wheel and reversal-preventing pawls are respectively formed with first and second retention cavities to retain springs and thus holding the reversal-preventing pawls in desired position. In addition, the present invention provides a pawl operation angle notch in the pawl for varying the operation angle. Further, the present invention provides an oblique enclosure groove for receiving and holding a retention stop plate fit therein to show an oblique or curved configuration that helps reduce contact area thereof with the pawls in constraining undesired positional shifting of the pawls.

Illustrated above are the embodiments of the present disclosure, which should not be considered limitative to the scope of the invention. Therefore, any equivalent substitutions or variations to the structures or processes disclosed in the specification and the drawing of the present disclosure, or a direct or indirect application of the invention to the other technical fields should be considered as part of the present disclosure.

What is claimed is:

1. A hub ratchet wheel driving structure, comprising:
a central axle, which has a first end portion that is received through and coupled to a hub with a plurality of first bearings interfacing therebetween and an opposite, second end portion that is received through and coupled to a ratchet wheel with a plurality of second bearings interfacing therebetween, the hub being formed, in one end thereof, with a diameter-enlarged stepped hole, which receives a stop plate therein and is coupled to a unidirectional grooved ring that is fixed therein through threading engagement, the ratchet wheel having an end corresponding to the hub and formed with a reduced-diameter stepped shaft that is fit into the diameter-enlarged stepped hole,
wherein the reduced-diameter stepped shaft of the ratchet wheel has a circumferential wall in which a plurality of horizontal retention troughs are formed to respectively receive, in a horizontal direction, rear ends of a plurality of reversal-preventing pawls;
wherein the ratchet wheel and front ends of the reversal-preventing pawls have portions opposite to each other and formed with first and second retention cavities, respectively, to receive and retain opposite ends of springs therein such that the springs constrain the reversal-preventing pawls respectively from positional shifting of the reversal-preventing pawls, the reversal-preventing pawls each having a surface formed with a pawl operation angle notch having a predetermined depth for setting and varying an operation angle of the reversal-preventing pawls; and
wherein the ratchet wheel is formed with an oblique enclosure groove that receives a retention stop plate to fit therein to be retained in the oblique enclosure groove in a curved configuration in order to prevent shifting of the reversal-preventing pawls with a reduced contact area therebetween.

2. The hub ratchet wheel driving structure as claimed in claim 1, wherein the retention stop plate is formed of a plastic steel plate.

3. The hub ratchet wheel driving structure as claimed in claim 1, wherein the second retention cavity is of a conic configuration diverging from inside toward outside.

4. The hub ratchet wheel driving structure as claimed in claim 1, wherein the unidirectional grooved ring comprises a plurality of unidirectional grooves formed therein and the pawl operation angle notch is provided for work in collaboratively with an angle of the unidirectional grooves of the unidirectional grooved ring to change the operation angle.

* * * * *